United States Patent
Line et al.

(10) Patent No.: US 11,654,811 B2
(45) Date of Patent: *May 23, 2023

(54) VEHICLE SEATING ASSEMBLY HAVING LOWER LEG SUPPORT AND SUSPENSION ASSEMBLY

(71) Applicant: Ford Global Technologies, LLC, Dearborn, MI (US)

(72) Inventors: Johnathan Andrew Line, Northville, MI (US); Jimmy Moua, Canton, MI (US); Deeptej Kudav, Southgate, MI (US); S. M. Akbar Berry, Windsor (CA); Spencer Robert Hoernke, Dundas (CA); Macit Aktas, Windsor (CA); Spencer Hoin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/746,220

(22) Filed: May 17, 2022

(65) Prior Publication Data

US 2022/0274518 A1 Sep. 1, 2022

Related U.S. Application Data

(63) Continuation of application No. 16/838,482, filed on Apr. 2, 2020, now Pat. No. 11,370,341.

(51) Int. Cl.
*B60N 2/90* (2018.01)
*B60N 2/22* (2006.01)

(52) U.S. Cl.
CPC ............... *B60N 2/995* (2018.02); *B60N 2/22* (2013.01)

(58) Field of Classification Search
CPC ....................................................... B60N 2/995
See application file for complete search history.

(56) References Cited

U.S. PATENT DOCUMENTS

| 3,087,757 A | 4/1963 | Hyman |
| 8,016,355 B2 | 9/2011 | Ito et al. |

(Continued)

FOREIGN PATENT DOCUMENTS

| DE | 3617709 A1 | 12/1987 |
| DE | 3729836 A1 | 3/1989 |

(Continued)

*Primary Examiner* — David R Dunn
*Assistant Examiner* — Tania Abraham
(74) *Attorney, Agent, or Firm* — Vichit Chea; Price Heneveld LLP

(57) ABSTRACT

A vehicle seating assembly includes a seat and a lower leg support. The seat includes a first end and a second end. The first and second ends are opposite to one another. The lower leg support is coupled to the seat at the second end and is movable relative to the seat between a retracted position and an extended position. A suspension assembly is coupled to the lower leg support. The suspension assembly includes a first end, a second end, and an intermediate portion. The first end of the suspension assembly is coupled to a portion of the seat. The second end of the suspension assembly is coupled proximate to a distal end of the lower leg support. A distance between an interior surface of the intermediate portion and an adjacent surface of each of the seat and the lower leg support may vary based on lower leg support position.

20 Claims, 6 Drawing Sheets

(56) References Cited

U.S. PATENT DOCUMENTS

| | | |
|---|---|---|
| 8,567,868 B2 | 10/2013 | Kuno |
| 10,232,756 B2 | 3/2019 | Kim et al. |
| 2006/0186721 A1 | 8/2006 | Flory et al. |
| 2010/0244534 A1 | 9/2010 | Driessen et al. |
| 2017/0341543 A1 | 11/2017 | Fujisawa et al. |
| 2018/0304791 A1 | 10/2018 | Hur et al. |
| 2019/0106038 A1 | 4/2019 | Rose et al. |
| 2020/0305608 A1 | 10/2020 | Grace et al. |
| 2021/0170931 A1 | 6/2021 | Line et al. |

FOREIGN PATENT DOCUMENTS

| | | | |
|---|---|---|---|
| DE | 102007042489 A1 | 3/2009 | |
| EP | 3543122 A1 * | 9/2019 | ............ A47C 1/035 |
| WO | 2005051705 A1 | 6/2005 | |

\* cited by examiner

VEHICLE SEATING ASSEMBLY HAVING LOWER LEG SUPPORT AND SUSPENSION ASSEMBLY

CROSS-REFERENCE TO RELATED APPLICATIONS

This application is a continuation application of U.S. patent application Ser. No. 16/838,482 filed Apr. 2, 2020, now U.S. Pat. No. 11,370,341, entitled "VEHICLE SEATING ASSEMBLY HAVING LOWER LEG SUPPORT AND SUSPENSION ASSEMBLY;" and related to U.S. Pat. No. 11,148,571 issued Oct. 19, 2021, entitled "VEHICLE SEATING ASSEMBLY HAVING A LOWER LEG SUPPORT." The aforementioned related applications are hereby incorporated by reference in their entirety.

FIELD OF THE DISCLOSURE

The present disclosure generally relates to vehicle seating assemblies. More specifically, the present disclosure relates to vehicle seating assemblies having a lower leg support and a suspension assembly.

BACKGROUND OF THE INVENTION

Vehicles are typically provided with a variety of measures that seek to improve the comfort and convenience of occupants. However, additional solutions are needed that seek to address some of the expanding desires of consumers for comfort and convenience.

SUMMARY OF THE INVENTION

According to a first aspect of the present disclosure, a vehicle seating assembly includes a seat, a lower leg support, and a suspension assembly. The seat includes a first end and a second end. The first and second ends of the seat are opposite to one another. The lower leg support is coupled to the seat at the second end. The lower leg support is movable relative to the seat between a retracted position and an extended position. The suspension assembly is coupled to the lower leg support. The suspension assembly includes a first end, a second end, and an intermediate portion. The intermediate portion is positioned between the first and second ends of the suspension assembly. The first end of the suspension assembly is coupled to a portion of the seat that is rearward of the second end of the seat. The second end of the suspension assembly is coupled proximate to a distal end of the lower leg support. The suspension assembly also includes a first thickness and a second thickness. The first thickness and the second thickness are arranged in an alternating pattern. A distance between an interior surface of the intermediate portion and an adjacent surface of each of the seat and the lower leg support varies as a function of a position of the lower leg support.

Embodiments of the first aspect of the present disclosure can include any one or a combination of the following features:

- a spacing between regions of the first thickness and regions of the second thickness vary based on a position along a length of the suspension assembly;
- adjacent regions of the first thickness are separated by one or more of the regions of the second thickness;
- the first thickness is greater than the second thickness;
- the second thickness acts as a living hinge for the suspension assembly;
- the suspension assembly is arcuate in shape;
- the suspension assembly assumes the arcuate shape in each position of the lower leg support as the lower leg support transitions between the retracted position and the extended position;
- a distance between the interior surface of the intermediate portion and the adjacent surface of the lower leg support is greatest when the lower leg support is in the extended position;
- the second end of the suspension assembly is movable relative to the distal end of the lower leg support;
- the lower leg support includes one or more channels with which the suspension assembly is coupled;
- the one or more channels facilitate the second end of the suspension assembly being movable relative to the distal end of the lower leg support;
- the retracted position of the lower leg support positions the lower leg support in a region below the seat;
- the first end of the suspension assembly is fixedly coupled to the seat, wherein the second end of the suspension assembly is fixedly coupled to the lower leg support; and
- actuation of the lower leg support toward the extended position provides a compression force that results in an increase in the distance between the interior surface of the intermediate portion and the adjacent surface of the lower leg support.

According to a second aspect of the present disclosure, a vehicle seating assembly includes a seat, a lower leg support, and a suspension assembly. The seat includes a first end and a second end. The first and second ends of the seat are opposite to one another. The lower leg support is coupled to the seat at the second end. The lower leg support is movable relative to the seat between a retracted position and an extended position. The suspension assembly is coupled to the lower leg support. The suspension assembly includes a first end, a second end, and an intermediate portion. The intermediate portion is positioned between the first and second ends of the suspension assembly. The first end of the suspension assembly is fixedly coupled to a portion of the seat that is rearward of the second end of the seat. The second end of the suspension assembly is fixedly coupled proximate to a distal end of the lower leg support. Actuation of the lower leg support toward the extended position provides a compression force that results in an increase in a distance between an interior surface of the intermediate portion and an adjacent surface of each of the seat and the lower leg support varies as a function of a position of the lower leg support.

Embodiments of the second aspect of the present disclosure can include any one or a combination of the following features:

- the suspension assembly includes a first thickness and a second thickness, with the first thickness and the second thickness being arranged in an alternating pattern;
- a spacing between regions of the first thickness and regions of the second thickness vary based on a position along a length of the suspension assembly;
- adjacent regions of the first thickness are separated by one or more of the regions of the second thickness, wherein the first thickness is greater than the second thickness, and wherein the second thickness acts as a living hinge for the suspension assembly;
- the suspension assembly is arcuate in shape, wherein the suspension assembly assumes the arcuate shape in each position of the lower leg support as the lower leg support transitions between the retracted position and the extended position; and a distance between the interior surface of the intermediate portion and the adjacent surface of the lower leg support is greatest when the lower leg support is in the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
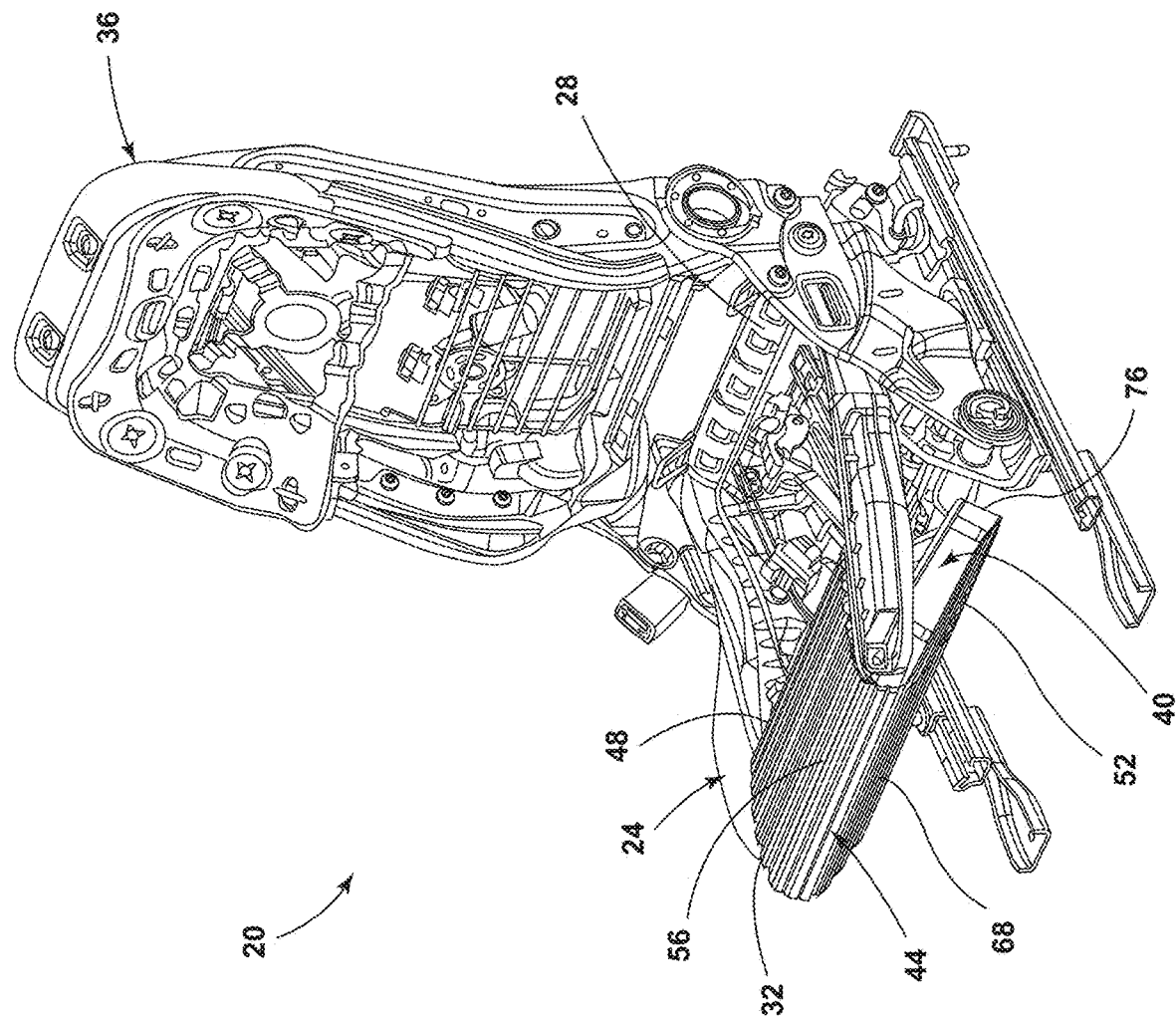
FIG. 1 is a side perspective view of a vehicle seating assembly, illustrating a lower leg support in a retracted position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-9, reference numeral 20 generally indicates a vehicle seating assembly. The vehicle seating assembly 20 includes a seat 24. The seat 24 includes a first end 28 and a second end 32. The first and second ends 28, 32 are opposite to one another (e.g., rearward end and forward end). In various examples, the vehicle seating assembly 20 further includes a seatback 36. The seatback 36 can be coupled to the seat 24 at the first end 28 of the seat 24. The seatback 36 may be movable relative to the seat 24. The vehicle seating assembly 20 includes a lower leg support 40 coupled to the seat 24 at the second end 32. The lower leg support 40 is movable relative to the seat 24 between a retracted position (see FIG. 1) and an extended position (see FIG. 2). The vehicle seating assembly 20 further includes a suspension assembly 44 coupled to the lower leg support 40. The suspension assembly 44 includes a first end 48, a second end 52, and an intermediate portion 56 that is positioned between the first and second ends 48, 52. The first end 48 of the suspension assembly 44 may be fixedly coupled to the seat 24. The second end 52 of the suspension assembly 44 may be fixedly coupled to the lower leg support 40. A distance 60 between an interior surface 64 of the intermediate portion 56 and an adjacent surface of each of the seat 24 and the lower leg support 40 may vary as a function of a position of the lower leg support 40. Actuation of the lower leg support 40 toward the extended position may provide a compression force that results in an increase in the distance 60 between the interior surface 64 of the intermediate portion 56 and the adjacent surface of the lower leg support 40. In various examples, the suspension assembly 44 may assume an arcuate shape in each position of the lower leg support 40 as the lower leg support 40 transitions between the retracted position and the extended position. A trim cover 66 extends over an exterior surface 68 of the suspension assembly 44. In some examples, a cushion is provided between the exterior surface 68 of the suspension assembly 44 and an interior surface of the trim cover 66.

Referring again to FIGS. 1 and 2, the vehicle seating assembly 20 is shown in a partially assembled state to aid in the depiction of the concepts disclosed herein. The vehicle seating assembly 20 is provided with the lower leg support 40, which is coupled to the seat 24. The lower leg support 40 is movable between the retracted position depicted in FIG. 1 and the extended position depicted in FIG. 2. The extended position depicted in FIG. 2 may represent a partially-extended position or a fully extended position. Accordingly, the lower leg support 40 of the present disclosure may be actuated to a position further extended than that depicted in FIG. 2 without departing from the concepts disclosed herein. In various examples, the lower leg support 40 is continually adjustable between the retracted position and the extended position such that a user 72 (see FIGS. 5 and 6) may adjust a position of the lower leg support 40 depending on their size and individual comfort preferences. The lower leg support 40 is coupled to the seat 24 at the second end 32 of the seat 24. The second end 32 of the seat 24 may be a forward most region of the seat 24 relative to the coupling between the seat 24 and the seatback 36. Said another way, the second end 32 of the vehicle seating assembly 20 may represent a region of the seat 24 that is proximate to a lower thigh region of the user 72 or a knee region of the user 72 when the user 72 is seated in the vehicle seating assembly 20. The suspension assembly 44 is coupled to both the seat 24 and the lower leg support 40. The first end 48 of the suspension assembly 44 is coupled to the seat 24 and the second end 52 of the suspension assembly 44 is coupled to the lower leg support 40. In various examples, the first end 48 of the suspension assembly 44 may be coupled to the seat 24 at a position that is rearward of the second end 32 of the seat 24. The coupling of the suspension assembly 44 to the seat 24 may be a fixed coupling such that the first end 48 of the suspension assembly 44 is secured in place. While being described as fixed or secured in place, the first end 48 of the suspension assembly 44 may be coupled to the seat 24 in a manner that permits rotational or pivotable motion of the intermediate portion 56 of the suspension assembly 44. The second end 52 of the suspension assembly 44 may be coupled to the lower leg support 40 proximate to a distal end 76 of the lower leg support 40. In various examples, the second end 52 of the suspension assembly 44 may be fixedly coupled to the lower leg support 40 such that the second end 52 is secured in place. While being described as fixed or secured in place, the coupling of the second end 52 of the suspension assembly 44 to the lower leg support 40 may permit rotational or pivotable motion of the intermediate portion 56 of the suspension assembly 44.

Figure 2:
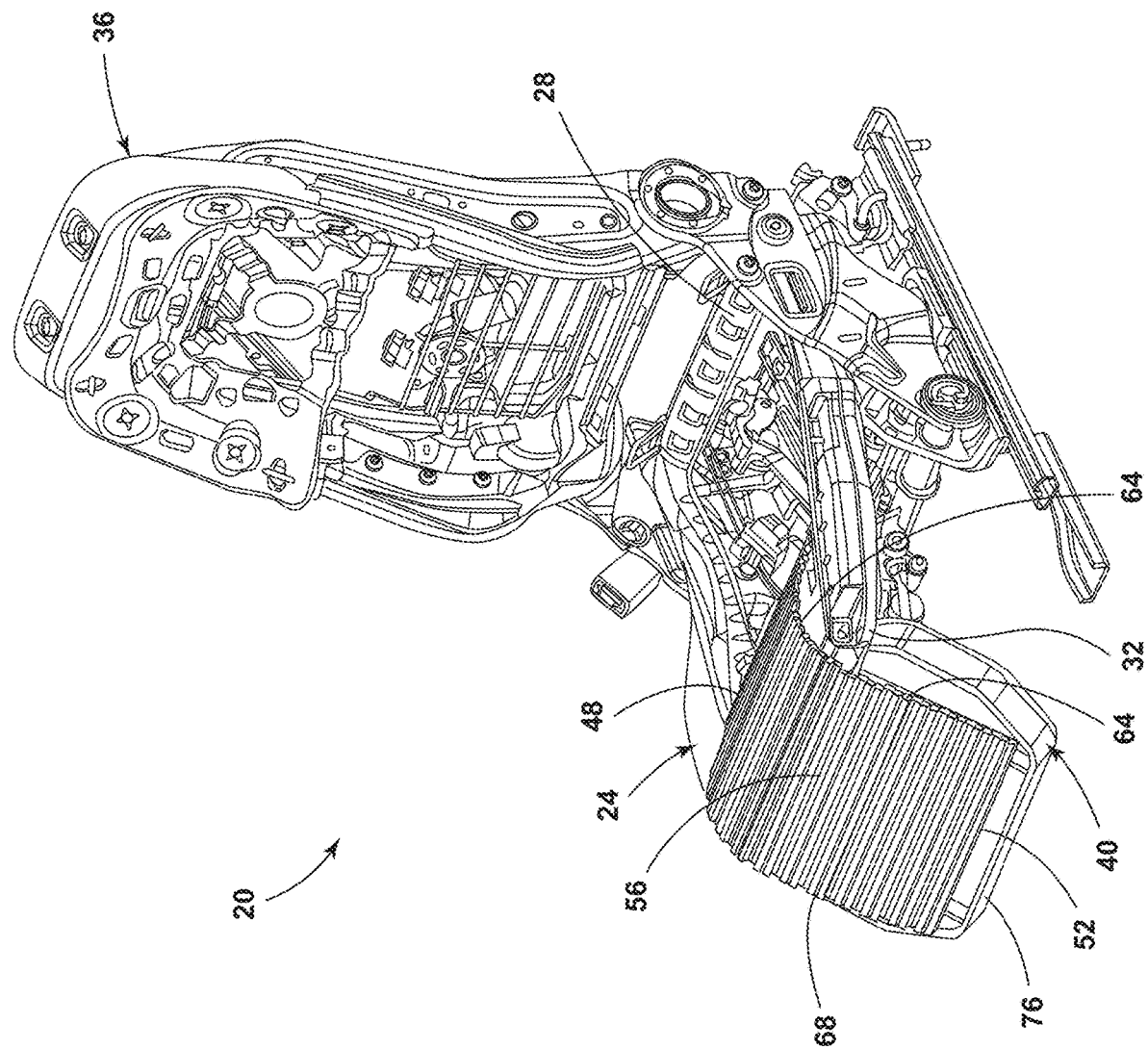
FIG. 2 is a side perspective view of the vehicle seating assembly, illustrating the lower leg support in an at least partially-extended position, according to one example.

Referring further to FIGS. 1 and 2, the intermediate portion 56 of the suspension assembly 44 may be free of permanent engagement with exterior surfaces of the seat 24 and the lower leg support 40. Providing the intermediate portion 56 of the suspension assembly 44 as free of permanent engagement with the seat 24 and the lower leg support 40 permits the intermediate portion 56 to extend and retract relative to exterior surfaces of the seat 24 and the lower leg support 40. Said another way, varying the distance 60 between the interior surface 64 of the suspension assembly 44 and the immediately adjacent surfaces of each of the seat 24 and the lower leg support 40 as a function of the position of the lower leg support 40 may be enabled by the lack of a permanent or fixed coupling between the interior surface 64 of the suspension assembly 44 and the immediately adjacent surfaces in the area associated with the intermediate portion 56. The retracted position of the lower leg support 40 positions the lower leg support 40 in a region below the seat 24. Said another way, the lower leg support 40 is positioned vertically below the seat 24 when the lower leg support 40 is in the retracted position. In various examples, the retracted position of the lower leg support 40 results in the lower leg support 40 and the seat 24 forming an acute angle such that the exterior surface of the lower leg support 40 may be oriented at an angle relative to a support surface to which the vehicle seating assembly 20 is coupled (e.g., a floor of an associated vehicle). For example, it may be beneficial to orient the lower leg support 40 at an angle that is not perpendicular to the support surface to which the vehicle seating assembly 20 is mounted. By so positioning the lower leg support 40 when in the retracted position, the lower leg support 40 may be prevented from unintentionally contacting the user 72 and may generally be positioned in a manner to prevent obstruction to the user 72.

Figure 3:
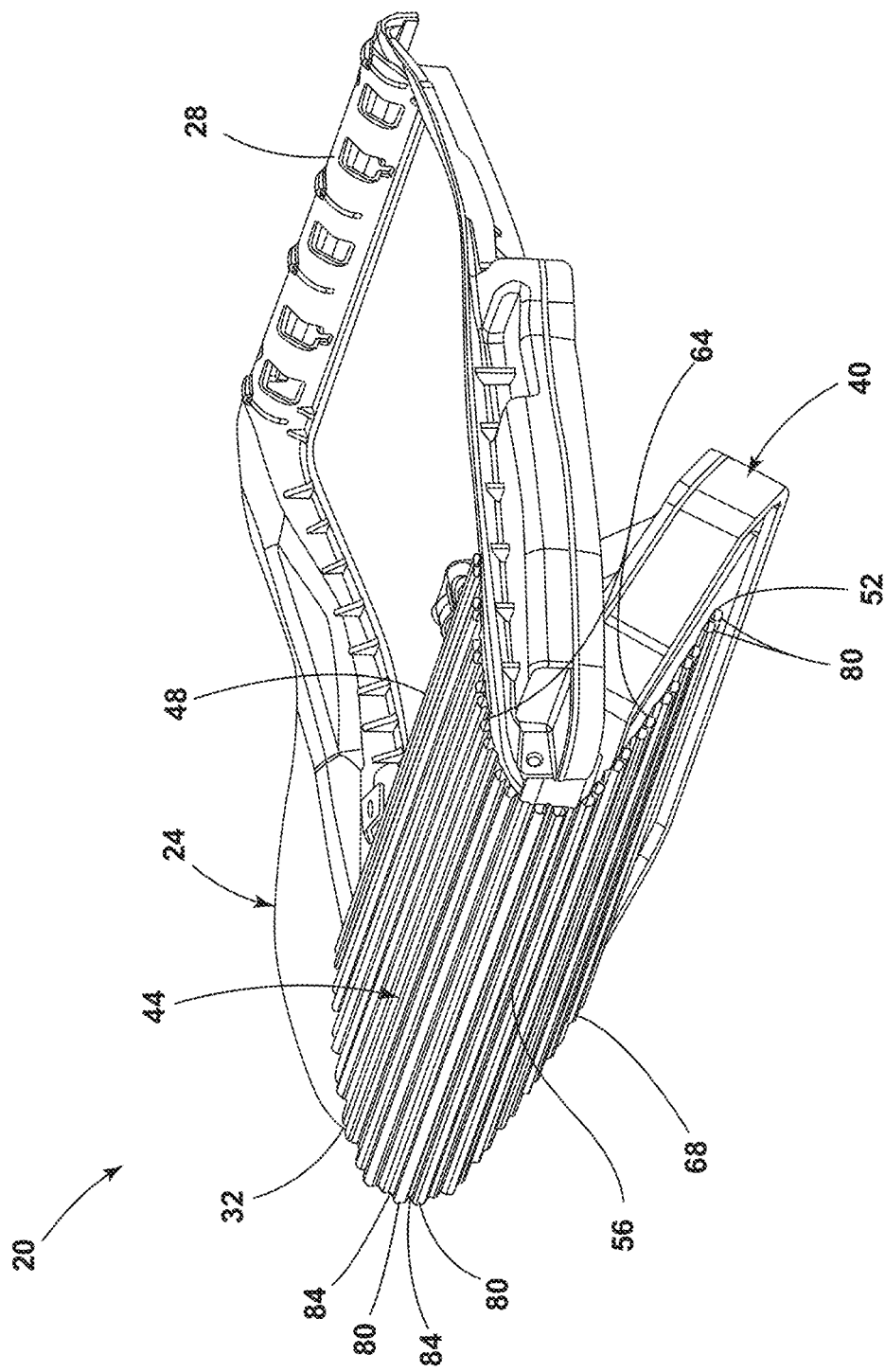
FIG. 3 is a side perspective view of a seat of the vehicle seating assembly, illustrating the lower leg support in the retracted position, according to one example.
Figure 4:
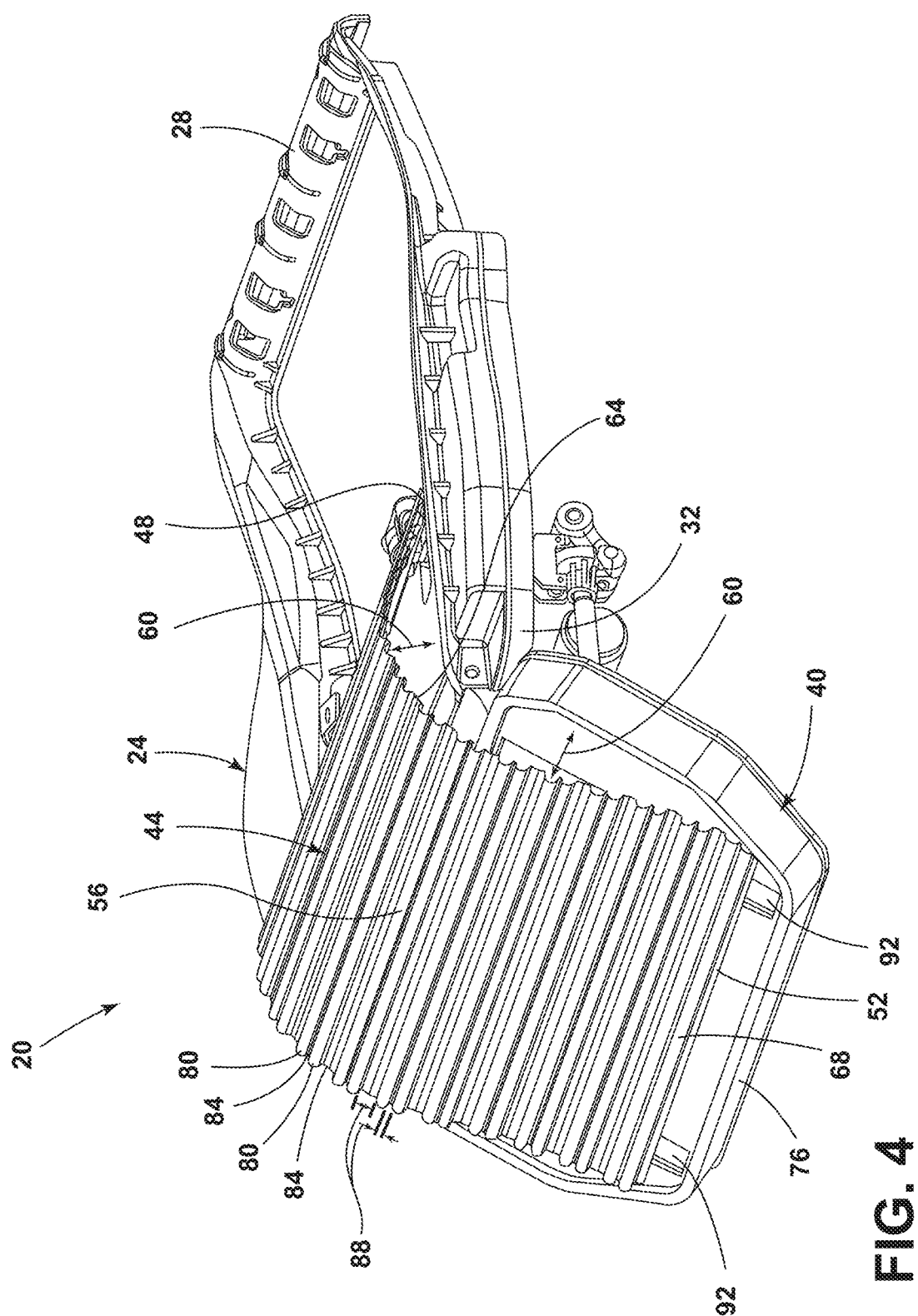
FIG. 4 is a side perspective view of the seat of the vehicle seating assembly, illustrating the lower leg support in the at least partially-extended position, according to one example.

Referring now to FIGS. 3 and 4, the suspension assembly 44 can include a first thickness 80 and a second thickness 84. In various examples, the first thickness 80 and the second thickness 84 may be arranged in an alternating pattern. For example, adjacent regions of the first thickness 80 may be separated by one or more of the regions of the second thickness 84. Similarly, adjacent regions of the second thickness 84 may be separated by one or more regions of the first thickness 80. In various examples, the pattern of alternation between the first thickness 80 and the second thickness 84 may vary as a function of a position along a length direction of the suspension assembly 44. The length direction of the suspension assembly 44, as well as the seat 24 and the lower leg support 40, may extend in what is commonly referred to as a fore-aft direction of the seat 24 and the lower leg support 40, which extends between the first end 28 of the seat 24 and the second end 32 of the seat 24. For example, the specific arrangement of the alternating pattern between the first thickness 80 and the second thickness 84 may coincide with a degree of flexibility for a given region of the suspension assembly 44. It is contemplated that it may be beneficial to provide increased flexibility to the suspension assembly 44 in regions of the intermediate portion 56 that experience the greatest degree of mobility (e.g., proximate to the coupling between the lower leg support 40 and the seat 24). Similarly, it may be beneficial to provide lesser flexibility or more rigidity to the suspension assembly 44 in the regions proximate to the first end 48 and the second end 52 of the suspension assembly 44 where the suspension assembly 44 is coupled to the seat 24 and the lower leg support 40, respectively. It is further contemplated that the arrangement of the alternating pattern of the first thickness 80 and the second thickness 84 may be utilized to encourage or otherwise induce an inflection point in the suspension assembly 44 as the lower leg support 40 is actuated toward the extended position. Accordingly, the suspension assembly 44 may provide a contour that closely matches a rearward side of the legs of the user 72 while positively engaging with the legs of the user 72 to provide active support to the legs of the user 72 when the lower leg support 40 is in the extended position. In various examples, the first thickness 80 may be greater than the second thickness 84. Accordingly, in some examples, the second thickness 84 may act as a living hinge for the suspension assembly 44 such that the arrangement and spacing of the alternating pattern between the first and second thicknesses 80, 84 can be used to tune the contour of the suspension assembly 44 as the lower leg support 40 is actuated from the retracted position to the extended position. Similar to the arrangement of the alternating pattern between the first and second thicknesses 80, 84, a spacing 88 between regions of the first thickness 80 and regions of the second thickness 84 may vary based on a position along the length of the suspension assembly 44. The variation in the spacing of the first and second thicknesses 80, 84 may be utilized to tune the contour of the suspension assembly 44.

Referring again to FIGS. 3 and 4, as stated above, the first end 48 of the suspension assembly 44 is coupled to the seat 24 and the second end 52 of the suspension assembly 44 is coupled to the lower leg support 40. In various examples, the first end 48 of the suspension assembly may be fixedly coupled to the seat 24 and/or the second end 52 of the suspension assembly 44 may be fixedly coupled to the lower leg support 40. As the lower leg support 40 is actuated from the retracted position toward the extended position, a path length of the suspension assembly 44 may be decreased. The path length is intended to refer to a distance that extends from the point at which the suspension assembly 44 is coupled to the seat 24, extending toward the second end 32 of the seat 24, extending over a junction between the seat 24 and the lower leg support 40, and extending to terminate at the point at which the suspension assembly 44 is coupled to the lower leg support 40. The suspension assembly 44 may be a fixed length. Accordingly, as the spatial relationship between the point on the seat 24 where the suspension assembly 44 is coupled and the point on the lower leg support 40 where the suspension assembly 44 is coupled is decreased, the compression force may begin to be applied to the suspension assembly 44 and thereby result in the suspension assembly 44 increasing the distance 60 between the interior surface 64 of the suspension assembly 44 and the immediately adjacent surfaces on the seat 24 and the lower leg support 40. As a displacement of the lower leg support 40 from the retracted position increases (e.g., toward the extended position), the compression force experienced by the suspension assembly 44 may also increase, thereby increasing the distance 60 between the interior surface 64 of the suspension assembly 44 and the immediately adjacent surfaces of the seat 24 and the lower leg support 40. In some examples, the coupling of the first end 48 on the suspension assembly 44 to the seat 24 and/or the coupling of the second end 52 of the suspension assembly 44 to the lower leg support 40 may be movable (e.g., not fixed). For example, the seat 24 and/or the lower leg support 40 may be provided with one or more channels 92 with which the suspension assembly 44 is coupled. As the lower leg support 40 is actuated between the retracted position and the extended position, the first end 48 and/or the second end 52 of the suspension assembly 44 may travel within the one or more channels 92 such that the position of the first end 48 and/or the second end 52 of the suspension assembly 44 may be adjusted to accomplish a desired contour of the suspension assembly 44.

Figure 5:
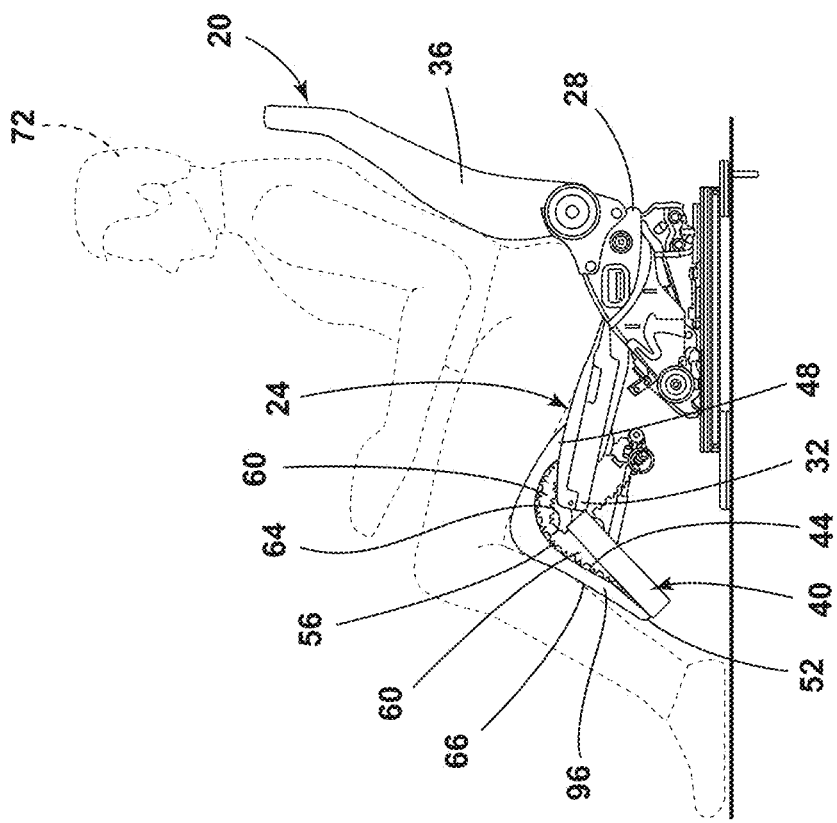
FIG. 5 is a side view of the vehicle seating assembly with the lower leg support in the at least partially-extended position, illustrating a smaller statured user, according to one example.
Figure 6:
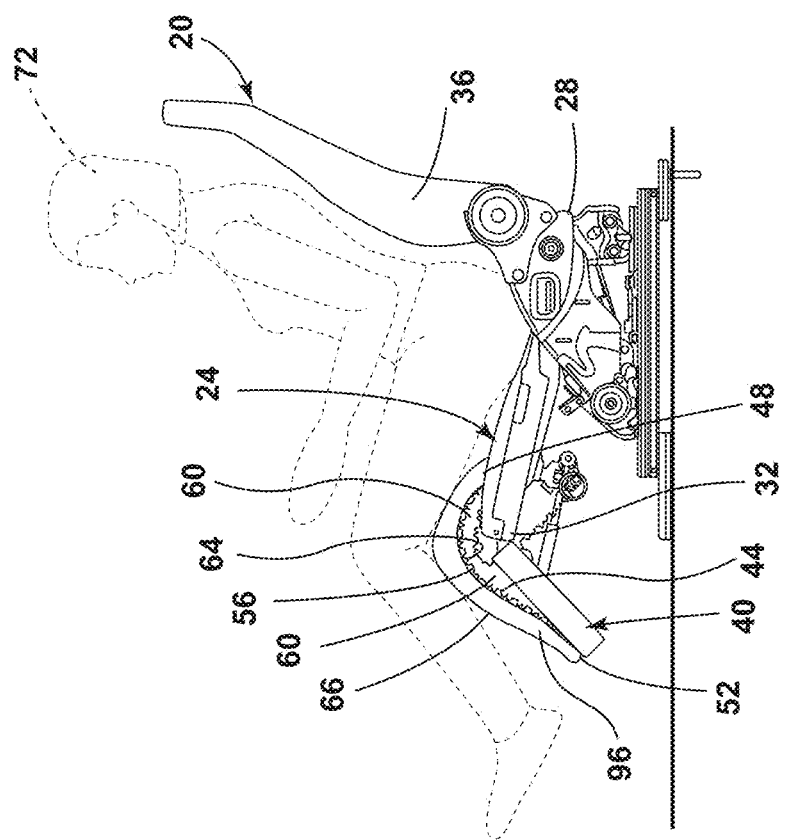
FIG. 6 is a side view of the vehicle seating assembly with the lower leg support in the at least partially-extended position, illustrating a larger statured user, according to one example.

Referring to FIGS. 5 and 6, the trim cover 66 extends over the exterior surface 68 of the suspension assembly 44. In various examples, a cushion 96 may be positioned between the trim cover 66 and the exterior surface 68 of the suspension assembly 44. The suspension assembly 44 is configured to assume a contoured shape that provides direct support to a rearward side of the legs of the user 72. For example, the suspension assembly 44 can provide direct support to the rearward side of the legs of a user 72 of smaller stature (FIG. 5), as well as the rearward side of the legs of a user 72 of a larger stature (FIG. 6). The contour that the suspension assembly 44 assumes upon extension of the lower leg support 40 from the retracted position urges the cushion 96 and/or the trim cover 66 toward the rearward side of the legs of the user 72. The compression force provided by the extension of the lower leg support 40 can provide an active engagement to the rearward side of the legs of the user 72, and may provide sufficient rigidity to the suspension assembly 44 to enable the suspension assembly 44 to lift the legs of the user 72. The arrangement of the first and second thicknesses 80, 84 in both spacing and pattern can provide a degree of compliance or give to the suspension assembly 44 such that a weight of the legs of the user 72 may cause the suspension assembly 44 to decrease the distance 60 between the interior surface 64 of the suspension assembly 44 and the immediately adjacent surface of the seat 24 and/or the lower leg support 40 in regions of the intermediate portion 56 where the legs of the user 72 are actively engaged by the suspension assembly 44, the cushion 96, and/or the trim cover 66. In various examples, the cushion 96 may additionally provide a degree of compliance or give such that the legs of the user 72 are actively engaged, supported, and cushioned.

Figure 7:
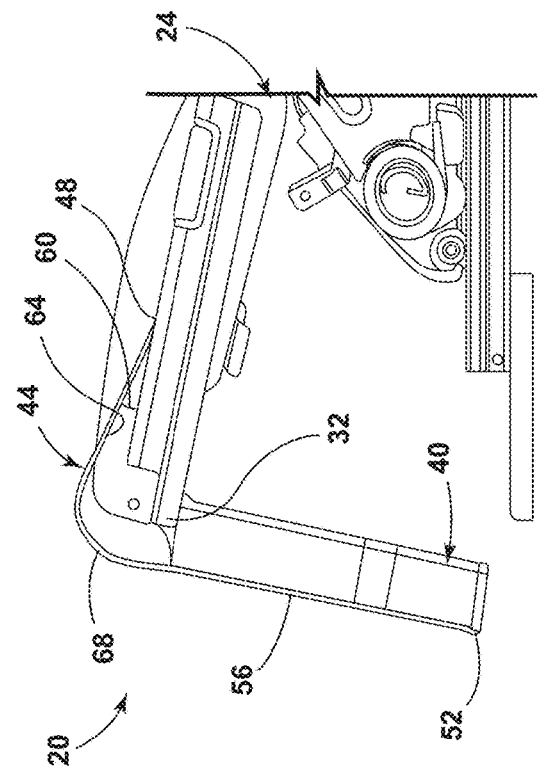
FIG. 7 is a side view of the vehicle seating assembly with the lower leg support in the retracted position, illustrating a relationship between the seat, the lower leg support, and a suspension assembly, according to one example.
Figure 8:
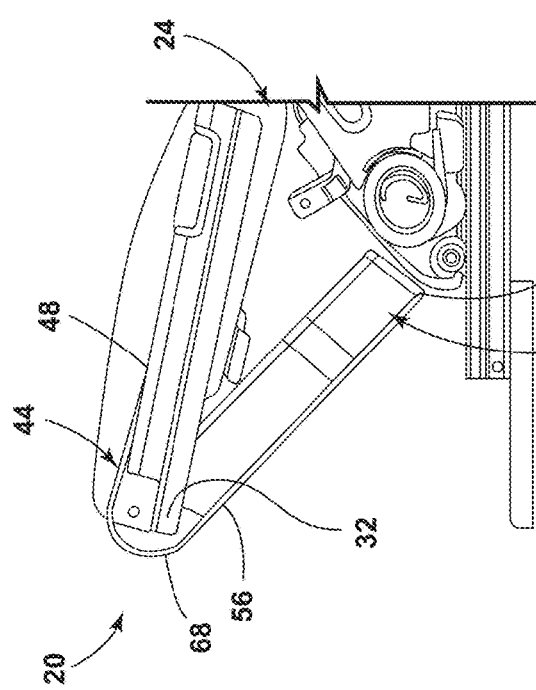
FIG. 8 is a side view of the vehicle seating assembly with the lower leg support in a partially-extended position, illustrating the relationship between the seat, the lower leg support, and the suspension assembly, according to one example.
Figure 9:
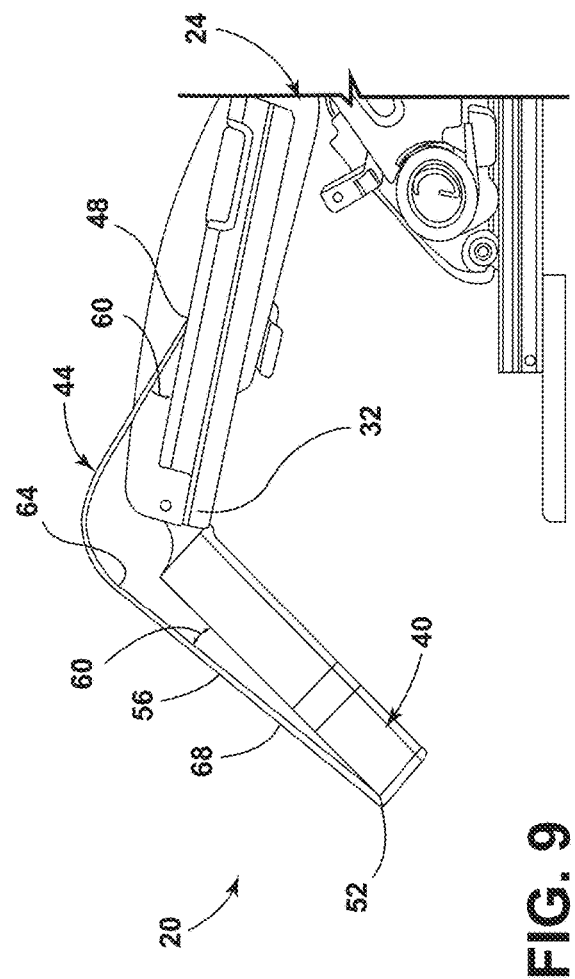
FIG. 9 is a side view of the vehicle seating assembly with the lower leg support in the at least partially-extended position, illustrating the relationship between the seat, the lower leg support, and the suspension assembly, according to one example.

Referring to FIGS. 7-9, the suspension assembly 44 can assume an arcuate shape in each position of the lower leg support 40 as the lower leg support 40 transitions between the retracted position (FIG. 7) and the extended position (FIG. 9). A cross-section or surface area of contact between the interior surface 64 of the suspension assembly 44 and the seat 24 may vary as a function of the position of the lower leg support 40. Similarly, a cross-section or surface area of contact between the interior surface 64 of the suspension assembly 44 and the lower leg support 40 may vary as a function of the position of the lower leg support 40. A distribution of contact between the suspension assembly 44, the seat 24, and the lower leg support 40 may also vary as a function of the position of the lower leg support 40. For example, as the lower leg support 40 is actuated from the retracted position to a partially-extended position (FIG. 8), the suspension assembly 44 may first decrease a surface area of contact with the seat 24. Additionally or alternatively, the surface area of contact between the suspension assembly 44 and the seat 24 may decrease at a greater rate or to a greater extent than the decrease in the surface area of contact between the suspension assembly 44 and the lower leg support 40. As the lower leg support 40 is actuated from the partially-extended position to the extended position (FIG. 9), the surface area of contact between the suspension assembly 44 and the lower leg support 40 may decrease. As with the surface area of contact between the suspension assembly 44, the seat 24, and the lower leg support 40, the distance 60 between the interior surface 64 of the suspension assembly 44 and the immediately adjacent surfaces of either the seat 24 or the lower leg support 40 may be adjusted at varying rates and/or to varying extents throughout the actuation path of the lower leg support 40.

If the lower leg support 40 is not provided with the suspension assembly 44, the lower leg support 40 may only engage a small surface area of the rearward side of the legs of the user 72. However, providing the suspension assembly 44 of the present disclosure enables a greater contact surface area between the components of the vehicle seating assembly 20 and a rearward side of the legs of the user 72 when the lower leg support 40 is extended. The greater surface area of contact between the rearward side of the legs of the user 72 and the components of the vehicle seating assembly 20, especially cushioned components of the vehicle seating assembly 20, can provide greater comfort to the user 72, and may serve to decrease pressure points that may be experienced during extended travel in a seated position.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
a seat having a first end and a second end, the first and second ends being opposite to one another;
a lower leg support coupled to the seat at the second end, the lower leg support being movable relative to the seat between a retracted position and an extended position; and
a suspension assembly coupled to the lower leg support, the suspension assembly comprising a first end, a second end, and an intermediate portion positioned between the first and second ends, wherein the first end of the suspension assembly is coupled to a portion of the seat that is rearward of the second end of the seat, wherein the second end of the suspension assembly is coupled proximate to a distal end of the lower leg support, wherein the suspension assembly further comprises a first thickness and a second thickness, with the first thickness and the second thickness being arranged in an alternating pattern, and wherein a distance between an interior surface of the intermediate portion and an adjacent surface of each of the seat and the lower leg support varies as a function of a position of the lower leg support.

2. The vehicle seating assembly of claim 1, wherein a spacing between regions of the first thickness and regions of the second thickness vary based on a position along a length of the suspension assembly.

3. The vehicle seating assembly of claim 1, wherein adjacent regions of the first thickness are separated by one or more of the regions of the second thickness.

4. The vehicle seating assembly of claim 1, wherein the first thickness is greater than the second thickness.

5. The vehicle seating assembly of claim 4, wherein the second thickness acts as a living hinge for the suspension assembly.

6. The vehicle seating assembly of claim 1, wherein the suspension assembly is arcuate in shape.

7. The vehicle seating assembly of claim 6, wherein the suspension assembly assumes the arcuate shape in each position of the lower leg support as the lower leg support transitions between the retracted position and the extended position.

8. The vehicle seating assembly of claim 1, wherein a distance between the interior surface of the intermediate portion and the adjacent surface of the lower leg support is greatest when the lower leg support is in the extended position.

9. The vehicle seating assembly of claim 1, wherein the second end of the suspension assembly is movable relative to the distal end of the lower leg support.

10. The vehicle seating assembly of claim 9, wherein the lower leg support comprises one or more channels with which the suspension assembly is coupled.

11. The vehicle seating assembly of claim 10, wherein the one or more channels facilitate the second end of the suspension assembly being movable relative to the distal end of the lower leg support.

12. The vehicle seating assembly of claim 1, wherein the retracted position of the lower leg support positions the lower leg support in a region below the seat.

13. The vehicle seating assembly of claim 1, wherein the first end of the suspension assembly is fixedly coupled to the seat, and wherein the second end of the suspension assembly is fixedly coupled to the lower leg support.

14. The vehicle seating assembly of claim 13, wherein actuation of the lower leg support toward the extended position provides a compression force that results in an increase in the distance between the interior surface of the intermediate portion and the adjacent surface of the lower leg support.

15. A vehicle seating assembly, comprising:
 a seat having a first end and a second end, the first and second ends being opposite to one another;
 a lower leg support coupled to the seat at the second end, the lower leg support being movable relative to the seat between a retracted position and an extended position; and
 a suspension assembly coupled to the lower leg support, the suspension assembly comprising a first end, a second end, and an intermediate portion positioned between the first and second ends, wherein the first end of the suspension assembly is fixedly coupled to a portion of the seat that is rearward of the second end of the seat, wherein the second end of the suspension assembly is fixedly coupled proximate to a distal end of the lower leg support, and wherein actuation of the lower leg support toward the extended position provides a compression force that results in an increase in a distance between an interior surface of the intermediate portion and an adjacent surface of each of the seat and the lower leg support varies as a function of a position of the lower leg support.

16. The vehicle seating assembly of claim 15, wherein the suspension assembly further comprises a first thickness and a second thickness, with the first thickness and the second thickness being arranged in an alternating pattern.

17. The vehicle seating assembly of claim 16, wherein a spacing between regions of the first thickness and regions of the second thickness vary based on a position along a length of the suspension assembly.

18. The vehicle seating assembly of claim 16, wherein adjacent regions of the first thickness are separated by one or more of the regions of the second thickness, wherein the first thickness is greater than the second thickness, and wherein the second thickness acts as a living hinge for the suspension assembly.

19. The vehicle seating assembly of claim 15, wherein the suspension assembly is arcuate in shape, and wherein the suspension assembly assumes the arcuate shape in each position of the lower leg support as the lower leg support transitions between the retracted position and the extended position.

20. The vehicle seating assembly of claim 15, wherein a distance between the interior surface of the intermediate portion and the adjacent surface of the lower leg support is greatest when the lower leg support is in the extended position.

* * * * *